United States Patent [19]

Towle

[11] 3,956,173

[45] May 11, 1976

[54] PREPARATION OF GELS BASED ON CARRAGEENAN

[75] Inventor: Gordon A. Towle, Newark, Del.

[73] Assignee: Hercules Incorporated, Wilmington, Del.

[22] Filed: July 5, 1974

[21] Appl. No.: 486,137

[52] U.S. Cl................................. 252/316; 424/49; 424/76; 426/575
[51] Int. Cl.² ..................... B01J 13/00; B01J 13/02
[58] Field of Search...................... 252/316; 426/575

[56] References Cited
UNITED STATES PATENTS

| | | | |
|---|---|---|---|
| 2,466,146 | 4/1949 | Baker | 252/316 X |
| 2,751,328 | 6/1956 | Sanders | 252/316 X |
| 2,927,055 | 3/1960 | Lanzet | 252/316 X |
| 3,415,758 | 12/1968 | Powell et al. | 252/316 |
| 3,804,951 | 4/1974 | Rapp | 426/575 X |

*Primary Examiner*—Richard D. Lovering
*Attorney, Agent, or Firm*—William S. Alexander

[57] ABSTRACT

Cold water gellable compositions are prepared based on the sodium salt of kappa-carrageenan and a potassium salt. Gelation is controlled so that good quality gels result by encapsulating the potassium salt in a water-soluble hydroxypropyl cellulose.

7 Claims, No Drawings

PREPARATION OF GELS BASED ON CARRAGEENAN

This invention relates to the preparation of firm, elastic gels based on carrageenan. More particularly, it relates to a composition based on kappa-carrageenan which can be caused to gel at room temperature and to an improved method of forming a gel therewith.

Carrageenan is a sulfated polysaccharide derived from red algae, commonly known as Irish moss. It is reported to be composed principally of alpha-D-galactopyranose-4-sulfate units and 3,6-anhydro-alpha-D-galactopyranose units. At least three forms are known, designated, respectively, as "iota", "kappa" and "lambda" carrageenan which differ in the ratios of the two galactopyranose units and accordingly in their sulfate ester content.

Kappa-carrageenan is the principal component in aqueous extracts from Chondrus crispus and Gigartina stellata. It is lower in sulfate ester content than iota and lambda carrageenans and exhibits unique properties in the presence of certain monovalent cations including potassium. It is with this form of carrageenan that the present invention is concerned.

As suggested, the kappa-carrageenan has been found to be reactive with potassium ion. The reaction with potassium ion in aqueous media forms a gel. Advantage has been taken of this characteristic in forming gels for food uses such as dessert jelly powders, pie fillings, sugar-free jams and jellies and canned meat products and in non-food uses such as air treating gels and toothpastes.

Carrageenans are normally removed from the red algae plant material by extraction in the presence of lime. Thus, commercial extracts are predominantly calcium salts of carrageenan.

In the past, all methods of forming gels from kappa-carrageenan have required a heating cycle due to the low solubility of calcium kappa-carrageenan in cold water. Hydration and dissolution are further prevented by the presence of the dissolved potassium salt. Heating the carrageenan--salt mixture to about 60° to 70°C. has been necessary, followed by cooling to less than 35°C. at which temperature gel formation occurs. For a variety of reasons, it would be desirable to be able to form such gels at room temperature.

Kappa-carrageenan becomes readily soluble in cold water when it is converted to the sodium salt form. However, its solubility is considerably reduced by the presence of potassium salts. Thus, it is necessary in forming gels of the sodium salt to permit the carrageenan to dissolve completely initially and thereafter to introduce the potassium salt. Inducing gel formation by addition of the potassium salt to a solution of the sodium kappa-carrageenan in a separate step is not possible as this invariably leads to localized gel formation and a broken gel texture.

The difficulties cited above are effectively avoided by the method of this invention wherein the potassium salt is encapsulated with a water-soluble hydroxypropyl cellulose and dry blended with the sodium kappa-carrageenan prior to adding to water to effect gelling. The water-soluble polymer dissolves more slowly than the sodium kappa-carrageenan, allowing the carrageenan to dissolve completely to form a homogeneous solution in the absence of dissolved potassium salt. The potassium salt then dissolves and diffuses over a period of several minutes and causes the gel to form. The slow dissolution and diffusion avoids formation of areas of high potassium concentration which could lead to non-homogeneous gel formation.

Concisely stated, the invention comprises an improvement in the method of preparing a gel based on carrageenan wherein carrageenan is dissolved in water and contacted with potassium ion, which improvement comprises the carrageenan being the sodium salt of kappa-carrageenan and the potassium ion being incorporated as a potassium salt encapsulated with hydroxypropyl cellulose with all of the gel-forming steps being carried out at room temperature.

Sodium kappa-carrageenan is not ordinarily found in nature. Naturally occurring carrageenan occurs as a mixed salt of magnesium, potassium, sodium, and other cations. During extraction and preparation of commercial carrageenans they are normally converted to a predominantly calcium form. For the purposes of this invention, the calcium salt is converted to the sodium salt by either direct extraction of the red algae (e.g., Chondrus crispus) with dilute NaOH solution or via ion exchange of calcium kappa-carrageenan with sodium carbonate. The latter method (ion exchange) appears to yield a superior product for most uses and is preferred.

Ion exchange between calcium and sodium is effected by treating a solution of calcium kappa-carrageenan with sodium carbonate, filtering off insoluble calcium carbonate, precipitating the sodium kappa-carrageenan with alcohol and drying the precipitated carrageenan. The carrageenan solution can be either a normal factory extract liquor taken prior to alcohol precipitation or a 1 to 2% solution prepared by dispersing a dry extract in water at 60° to 70°C. An alternate method involves washing calcium kappa-carrageenan with a solution of 55% alcohol containing 5% sodium chloride.

The potassium salt can be any water-soluble salt which is not harmful in the application for which the gel is intended. For most applications, potassium chloride will be the salt of choice. For food use, potassium chloride is biologically acceptable but imparts a bitter flavor at levels above about 0.2%. Thus, for food use, other potassium salts such as potassium phosphate or potassium citrate may be preferred.

In order to be operative in the process of the invention, the potassium salt must be encapsulated or coated with the water-soluble polymer. It is not satisfactory simply to blend the potassium salt and the water-soluble polymer as, e.g., by a coprecipitation technique which results in the salt being distributed throughout the polymer. Products of this type release the salt too rapidly. Instead of gelling in this instance the sodium kappa-carrageenan fails to dissolve completely and a firm coherent gel texture does not result.

Encapsulation of the potassium salt can be accomplished by several methods. A presently preferred technique is to dissolve the water-soluble polymer in an organic solvent which is a nonsolvent for the salt and spray this onto the dry, small particle size salt using a fluidized bed coater. Any other method which completely and uniformly coats the salt particles may be employed.

For most applications, the potassium salt can be coated with about 10 to 30% of its own weight of polymer. This limit is not critical except that higher add-on levels can retard the dissolution excessively and increase the time to achieve full gel strength. In the ordinary case, lower add-on levels will not give sufficient retardation time and uniform gel formation.

Carrageenan powder blends are usually compounded with a weight of sugar or other inert material equal to from 5–10 times the weight of carrageenan to aid in dispersion.

This sugar retards dissolution of the hydroxypropyl cellulose coating on the potassium salt and, accordingly, extends the gel-forming time. When sugar is present, the hydroxypropyl cellulose coating weight can be decreased to as low as about 20% and satisfactory gelling will still be experienced.

In preparing gels according to this invention, it is preferred first to prepare a dry blend of the sodium kappa-carrageenan, sugar, if used, and the encapsulated potassium salt. Such a blend has the highly advantageous quality of being easy to use as it need only be added to water, stirred, and then allowed to sit to form the desired gel. This is an important characteristic of a product for the consumer market. If circumstances otherwise permit or require, the sodium kappa-carrageenan can be dissolved completely and the encapsulated potassium salt added and stirred into this solution. Dissolution and diffusion are slow enough to permit homogeneous gel formation in the same manner as in the more preferred method just described.

One further characteristic of the gels prepared according to this invention is that upon standing over a period of several hours they tend to undergo syneresis. This tendency is also a characteristic of gels formed by the more conventional heat/cool techniques. It can be overcome in both cases by incorporation of up to about 50% by weight of other natural water-soluble polysaccharides such as iota-carrageenan, guar gum, or cellulose gum. Thus, this invention involves forming a gel from a mixture of sodium kappa-carrageenan and other water-soluble polysaccharides.

The invention will now be illustrated by several examples demonstrating the effect of various parameters on the quality of the gel formed by the method. Parts and percentages are by weight unless otherwise indicated. Also, unless otherwise indicated, the following procedures were employed for each example.

A. Preparation of Coated Potassium Salt

Potassium chloride in the form of 28 to 60 mesh (Tyler) particles was suspended in a stream of warm air in a 12-inch Wurster fluidized bed coater (Dairy Equipment Company, Madison, Wisconsin). It was sprayed with a 5% solution of hydroxypropyl cellulose (Klucel LF, Hercules Incorporated, Wilmington, Delaware) in acetone. Portions corresponding to 10, 20 and 30% hydroxypropyl cellulose add-on were withdrawn at appropriate intervals.

B. Preparation of Sodium Kappa-Carrageenan

Commercial calcium kappa-carrageenan of particle size less than 100 mesh was suspended in approximately 20 times its weight of a 5% solution of sodium chloride in 55% isopropyl alcohol in water for one hour with stirring at room temperature. This product was filtered, washed with 60% isopropanol containing 5% sodium chloride and finally with 99% isopropanol. The product was dried under reduced pressure at 50°C. and sieved to pass a 100-mesh screen.

C. Testing of Gels

Gels were evaluated using a Bloom gelometer (Precision Scientific Co., Chicago, Ill.) equipped with a 1-inch diameter plunger set for 4 mm. travel. Gel strength is defined by the force in grams required to depress the plunger into the gel a distance of 4 mm.

EXAMPLE 1

Dry blends were prepared consisting of 1.4 parts sodium kappa-carrageenan, 0.4 part potassium chloride coated with 30% of its weight of hydroxypropyl cellulose and 13.6 parts fine sugar. These blends were added to 125 parts of deionized water at about 25°C. and subjected to moderate stirring for various time periods from the start of addition. Gel strengths were then measured 1 hour after the cessation of stirring. Results are recorded in Table I below.

Table I

| Run No. | Stirring Time | Gel Strength |
|---|---|---|
| 1 | ½ minute | 32 |
| 2 | 1 " | 86 |
| 3 | 1½ " | 100 |
| 4 | 2 " | 110 |
| 5 | 3 " | 77 |
| 6 | 4 " | 38 |

*No gel after 1 hour. Gel strength of 95 after standing overnight.

EXAMPLE 2

In this example blends similar to those of Example 1 were prepared except that the amount of encapsulated potassium chloride was varied. Stirring time was constant at one minute and water temperature was about 20°C. Pertinent data are recorded in Table II.

Table II

| Run No. | Parts of Encapsulated KCl | Gel Strength |
|---|---|---|
| 1 | 0.1 | No gel |
| 2 | 0.2 | Small layer of weak gel in bottom of jar |
| 3 | 0.3 | Gel too weak to measure |
| 4 | 0.4 | 69 |
| 5 | 0.5 | 101 |
| 6 | 0.6 | 155 |
| 7 | 0.8 | 222 |
| 8 | 1.0 | 260 |
| 9 | 1.5 | 323 |
| 10 | 2.0 | 347 |

EXAMPLE 3

The procedure according to the previous examples was repeated except that the hydroxypropyl cellulose add-on was varied between 10 and 30% and the concentration of the encapsulate was varied so that the concentration of KCl was the same ±~10% in the three runs. Pertinent data are recorded in Table III.

Table III

| Run No. | HPC Add-on | Coated KCl Conc. | Gel Strength |
|---|---|---|---|
| 1 | 10 | 0.32 | 40 |
| 2 | 20 | 0.36 | 110 |
| 3 | 30 | 0.40 | 140 |
| 4 | 0 | 0.28 | No gel |

EXAMPLE 4

The standard blends described in Example 1 were added to 125 parts of water at various temperatures and stirred for one minute. Temperature was allowed to reach room temperature without any affirmative heating or cooling step. Gel strengths were measure after 1 hour. Pertinent data are recorded in Table IV.

Table IV

| Run No. | $H_2O$ Temperature | Gel Strength |
| --- | --- | --- |
| 1 | 10°C. | 130 |
| 2 | 20°C. | 125 |
| 3 | 30°C. | 55 |
| 4 | 40°C. | 45 |

EXAMPLE 5

Using the standard blend from Example 1, a gel was prepared in exactly the manner described in Example 1. The strength of this gel was determined periodically upon standing for 3 hours. Results of these measurements are recorded in Table V.

Table V

| Time | Gel Strength |
| --- | --- |
| 15 minutes | 75 |
| 30 minutes | 125 |
| 60 minutes | 155 |
| 180 minutes | 180 |

EXAMPLE 6

A dry blend was prepared consisting of 1 part of 100–150 mesh (Tyler) sodium kappa-carrageenan and 0.4 part hydroxypropyl cellulose coated potassium chloride (30% add-on). This was added to 100 parts water at 20° with stirring and stirring continued for a total of 2 minutes. After 1 hour, this mixture had formed a clear gel having a strength of 134 g. Bloom.

EXAMPLE 7

A dessert gel formulation was prepared by dry blending the following ingredients:

| | | |
| --- | --- | --- |
| Sodium kappa-carrageenan | 1.4 | part |
| Sodium iota-carrageenan | 0.2 | part |
| KCl encapsulated with 30% | 0.4 | part |
| Fine sugar | 13.6 | parts |
| Citric acid | 0.05 | part |
| Lemon flavor | 0.005 | part |
| Yellow food color | 1 | drop |

This blend was added to water at room temperature, stirred for 1 minute and allowed to stand overnight at 5°C. Its gel strength at this point was 150 grams. The gel could be readily removed from the molding container, was free standing and easily spoonable. It had a pleasing consistency and mouth-feel and remained free of syneresis for several hours.

What I claim and desire to protect by Letters Patent is:

1. In the method of preparing a gel based on carrageenan where carrageenan is dissolved in water and contacted with potassium ion, the improvement which comprises the carrageenan being the sodium salt of kappa-carrageenan and the potassium ion being incorporated in the form of a water-soluble potassium salt encapsulated in water-soluble hydroxypropyl cellulose.

2. The method of claim 1 wherein the dissolution in water and contacting with potassium ion are carried out at room temperature.

3. The method of claim 1 wherein the sodium kappa-carrageenan and the encapsulated potassium salt are dry blended prior to being incorporated into the water.

4. The method of claim 3 wherein the dissolution in water and contacting with potassium ion are carried out at room temperature.

5. The method of claim 2 wherein the potassium salt is potassium chloride.

6. The method of claim 4 wherein the potassium salt is potassium chloride.

7. The method of claim 6 wherein another polysaccharide is present in addition to the sodium kappa-carrageenan.

* * * * *